US011519505B2

(12) United States Patent
Larson et al.

(10) Patent No.: US 11,519,505 B2
(45) Date of Patent: Dec. 6, 2022

(54) MULTI-LAYER STEEL GASKET

(71) Applicant: Federal-Mogul Motorparts LLC, Southfield, MI (US)

(72) Inventors: Richard Michael Larson, Des Plaines, IL (US); Bartosz Gagor, Northlake, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 17/211,287

(22) Filed: Mar. 24, 2021

(65) Prior Publication Data

US 2022/0307599 A1    Sep. 29, 2022

(51) Int. Cl.
*F16J 15/08*    (2006.01)

(52) U.S. Cl.
CPC ...... *F16J 15/0825* (2013.01); *F16J 2015/085* (2013.01); *F16J 2015/0868* (2013.01)

(58) Field of Classification Search
CPC .............. F16J 15/0825; F16J 2015/085; F16J 2015/0868
See application file for complete search history.

(56) References Cited

U.S. PATENT DOCUMENTS

| 4,739,999 | A | * | 4/1988 | Ishii | F16J 15/0825 277/601 |
| 4,836,562 | A | * | 6/1989 | Yoshino | F16J 15/0825 277/595 |
| 4,938,488 | A | * | 7/1990 | Udagawa | F16J 15/0825 277/595 |
| 5,431,418 | A | | 7/1995 | Hagiwara et al. | |

(Continued)

FOREIGN PATENT DOCUMENTS

| DE | 102016002582 A1 | 8/2017 |
| EP | 1404993 B1 | 2/2005 |

OTHER PUBLICATIONS

Advanced Auto Parts "Mahle Original Exhaust Manifold Gasket Set", Mar. 24, 2021, retrieved from the internet URL: https://shop.advanceautoparts.com/p/mahle-original-exhaust-manifold-gasket-set-ms19399/10307083-P?utm_medium=ymme (3 pages).

Best Buy "Fel-Pro Exhause Manifold Gasket Set", Mar. 24, 2021, retrieved from Internet URL: https://www.dpars.com/en/Product/Fel-Pro/Exhaust-Manifold-Gasket-Set/MS%2097274 (3 pages).

(Continued)

*Primary Examiner* — Nicholas L Foster
(74) *Attorney, Agent, or Firm* — Federal-Mogul Motorparts LLC

(57) ABSTRACT

A multi-layer metal gasket includes a first functional layer and a second functional layer. A bore and a fastener hole extend through the first and second functional layers. The first functional layer has a first embossment protruding toward the second functional layer and the second functional layer has a second embossment protruding toward the first functional layer. The first embossment and the second embossment each encircle the bore. An intermediate layer is between the first and second functional layers. The intermediate layer extends between the first embossment and the second embossment and extends from the first and second embossments to the fastener hole. A spacer layer is between the intermediate layer and the first functional layer. The spacer layer has an inner edge defining a hole through the spacer layer. The inner edge encircles the first embossment. The spacer layer extends from the inner edge to the fastener hole.

20 Claims, 7 Drawing Sheets

(56) References Cited

U.S. PATENT DOCUMENTS

| | | | | |
|---|---|---|---|---|
| 5,544,900 A * | 8/1996 | Aoki | ............. | F16J 15/0825 277/595 |
| 5,628,518 A | 5/1997 | Ushio et al. | | |
| 6,315,303 B1 * | 11/2001 | Erb | ............. | F16J 15/0825 277/593 |
| 6,851,677 B2 * | 2/2005 | Miyaoh | ............. | F16J 15/0825 277/594 |
| 7,753,378 B2 * | 7/2010 | Kinoshita | ............. | F16J 15/0825 277/593 |
| 7,905,211 B2 * | 3/2011 | Yasuda | ............. | F16J 15/0825 123/195 R |
| 8,033,263 B2 * | 10/2011 | Yasuda | ............. | F16J 15/0825 123/195 R |
| 9,695,936 B2 | 7/2017 | Henne et al. | | |
| 10,670,148 B2 * | 6/2020 | Niwa | ............. | F01N 13/1844 |
| 2005/0179210 A1 * | 8/2005 | Sueda | ............. | F16J 15/0825 277/592 |
| 2007/0267823 A1 * | 11/2007 | Kinoshita | ............. | F16J 15/0825 277/594 |
| 2008/0197579 A1 * | 8/2008 | Imai | ............. | F16J 15/0825 277/593 |
| 2008/0203676 A1 * | 8/2008 | Yasuda | ............. | F16J 15/0825 277/595 |
| 2008/0203677 A1 * | 8/2008 | Yasuda | ............. | F16J 15/0825 277/595 |
| 2011/0024992 A1 * | 2/2011 | Yasuda | ............. | F16J 15/0825 277/592 |
| 2018/0266558 A1 * | 9/2018 | Niwa | ............. | F16J 15/0818 |
| 2018/0266559 A1 | 9/2018 | Schmucker | | |
| 2020/0011421 A1 | 1/2020 | Swasey et al. | | |

OTHER PUBLICATIONS

ECS Tuning "Genuine Volkswage Audi Exhaust Manifold Gasket", Mar. 24, 2021, retrieved from Internet URL: https://www.ecstuning.com/b-genuine-volkswagen-audi-parts/exhaust-manifold-gasket/03I253039f/ (2 pages).

* cited by examiner

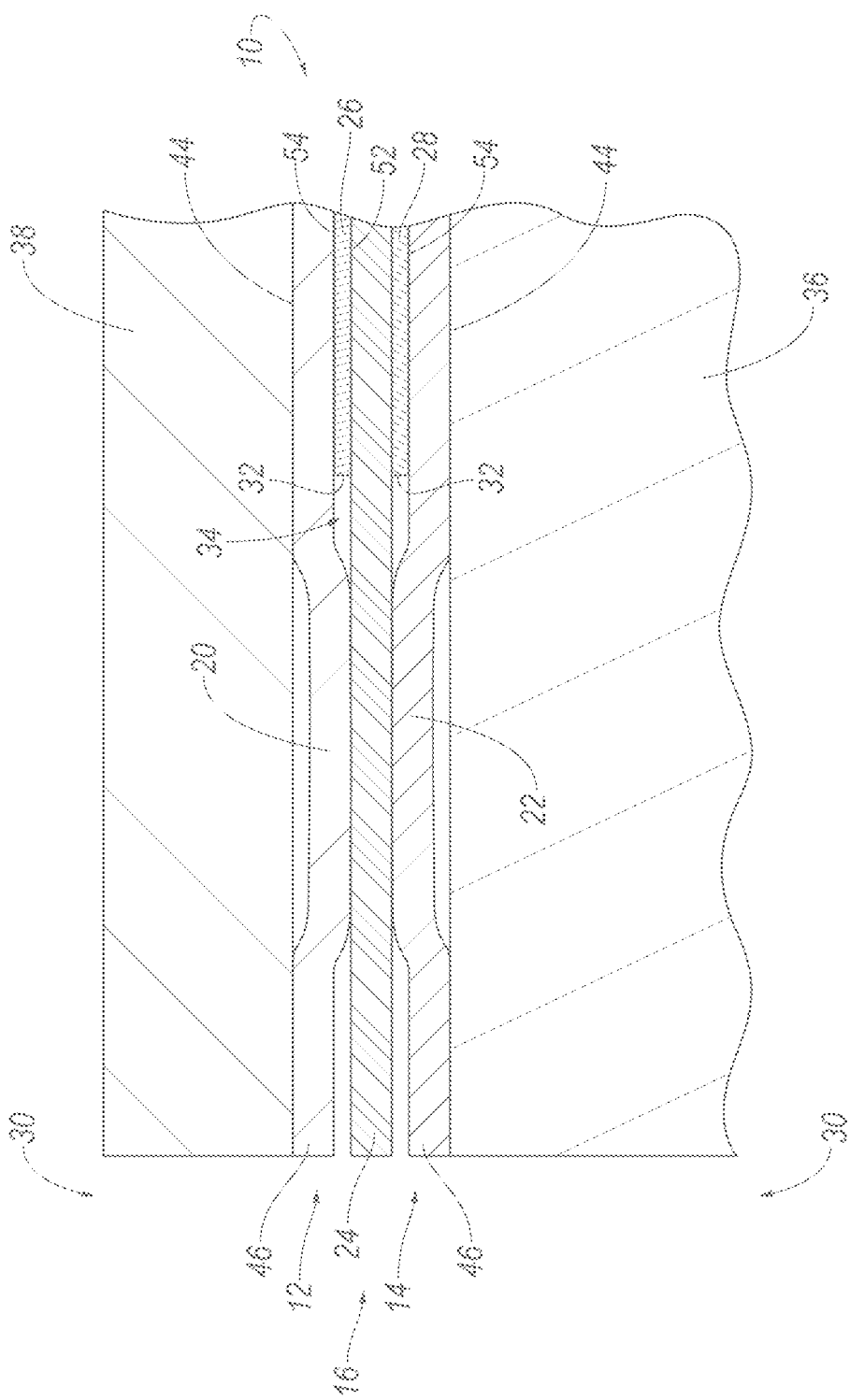

MULTI-LAYER STEEL GASKET

BACKGROUND

An cylinder head and an exhaust manifold of an internal combustion engine are sealed gas-tight with a gasket. The gasket includes multiple layers that are typically metal. The layers, in combination, ensure a gas-tight seal between the cylinder head and the exhaust manifold. At least one of the layers is a functional layer that has an embossment that is flattened as the exhaust manifold is tightened to the cylinder head with fasteners. The embossment biases the functional layer toward metal-to-metal contact between the functional layer and the cylinder head or exhaust manifold.

It is desirable that the embossment is resilient to maintain sealing contact between the cylinder head and the exhaust manifold during the range of thermal expansion and contraction of the cylinder head and/or the exhaust manifold, e.g., due to temperature variation between a cold start and normal engine operating temperature. In addition, the cylinder head and the exhaust manifold may thermally expand and contract differently based on cooling differences and material differences.

Assembly of the exhaust manifold to the cylinder head compresses the embossment. Over-compression of the embossment reduces the resiliency of the embossment leading to poor sealing performance over a range of times and temperatures. Over-compression may be a result of tightening of the exhaust manifold and the cylinder head at the location of the embossment and/or flange bending of the gasket caused by fasteners that connect the exhaust manifold to the cylinder head.

BRIEF DESCRIPTION OF THE DRAWINGS

FIG. 9 is a cross-section of the second embodiment of the gasket, an cylinder head, and an exhaust manifold after assembly.

DETAILED DESCRIPTION

Figure 1:
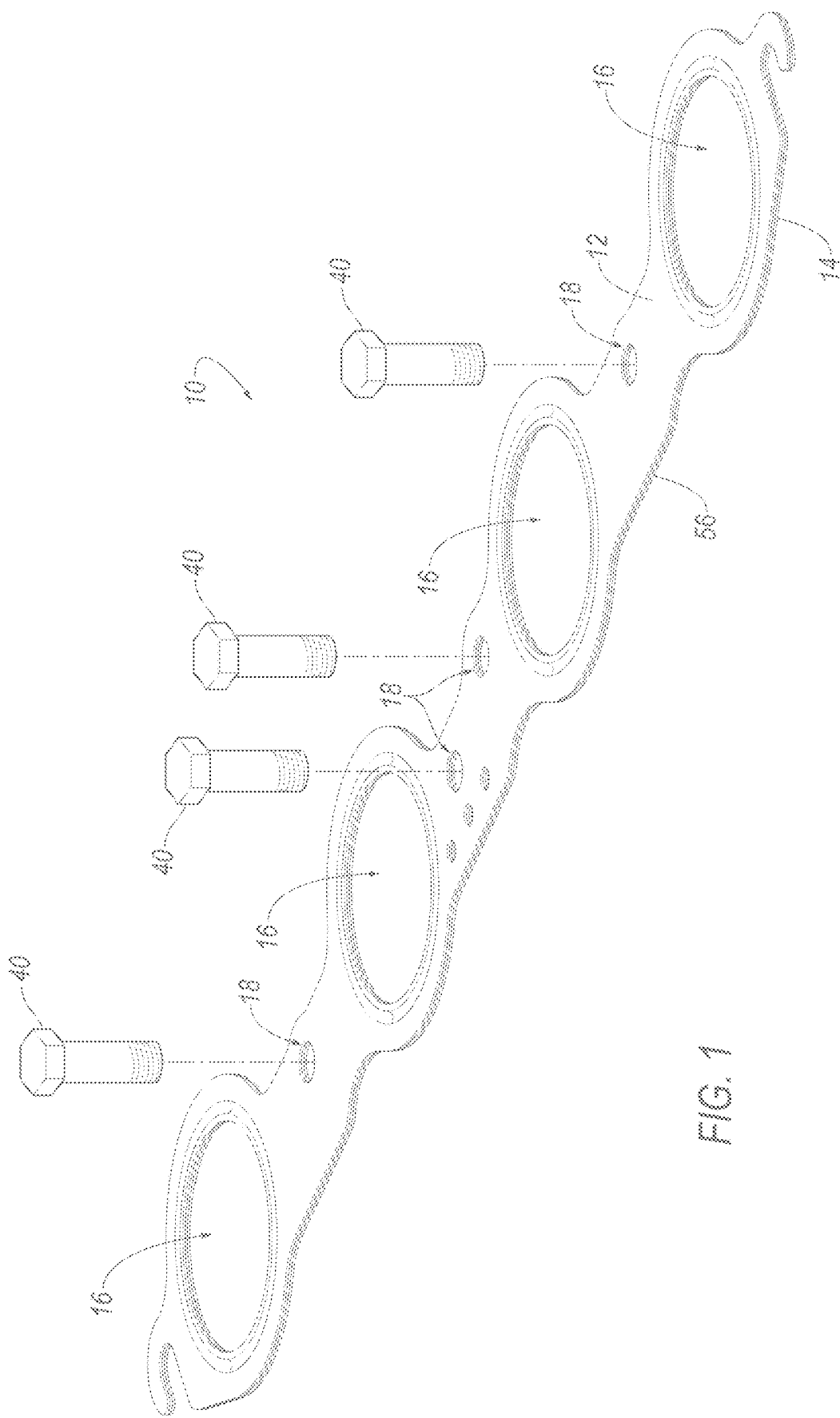
FIG. 1 is a perspective view of a multi-layer metal gasket.

With reference to the figures, wherein like numerals identify like elements, a multi-layer metal gasket 10 (hereinafter referred to as gasket 10) is generally shown. The gasket 10 includes a first functional layer 12 and a second functional layer 14. A bore 16 extends through the first functional layer 12 and the second functional layer 14. A fastener hole 18 extends through the first functional layer 12 and the second functional layer 14. The first functional layer 12 has a first embossment 20 protruding toward the second functional layer 14 and the second functional layer 14 has a second embossment 22 protruding toward the first functional layer 12. The first embossment 20 and the second embossment 22 each encircle the bore 16. An intermediate layer 24 is between the first functional layer 12 and the second functional layer 14. The intermediate layer 24 extends between the first embossment 20 and the second embossment 22 and extends from the first embossment 20 and the second embossment 22 to the fastener hole 18. A spacer layer 26 is between the intermediate layer 24 and the first functional layer 12. The spacer layer 26 has an inner edge 32 defining a hole 34 through the spacer layer 26. The inner edge 32 encircles the first embossment 20. The spacer layer 26 extends from the inner edge 32 to the fastener hole 18.

The gasket 10 is assembled to an internal combustion engine between an cylinder head 36 and an exhaust manifold 38. Specifically, the gasket 10 provides metal-to-metal contact between the gasket 10 and the cylinder head 36 and between the gasket 10 and the exhaust manifold 38 to fluidly seal (specifically, a gas-tight seal) the exhaust manifold 38 to the cylinder head 36. The gasket 10 abuts both the cylinder head 36 and the exhaust gas manifold. The first embossment 20 and the second embossment 22 resiliently bias the first functional layer 12 and the second functional layer 14 toward the cylinder head 36 and the exhaust manifold 38 to fluidly seal therebetween (specifically, a gas-tight seal). The spacer layer 26 controls compression of the first embossment 20 and/or the second embossment 22 when the exhaust manifold 38 is assembled to the cylinder head 36 to maintain the resiliency of the first embossment 20 and/or the second embossment 22 to ensure that the gasket 10 maintains contact with the cylinder head 36 and the exhaust manifold 38 through a range of times and temperatures. Specifically, the spacer layer 26 prevents over-compression and over-flattening of the first embossment 20 and/or the second embossment 22. Since the spacer layer 26 extends to the fastener hole 18, the spacer layer 26 also reduces or eliminates flange bending resulting from tightening a fastener 40 that extends through the fastener hole 18 to engage the exhaust manifold 38 and the cylinder head.

Figure 7:
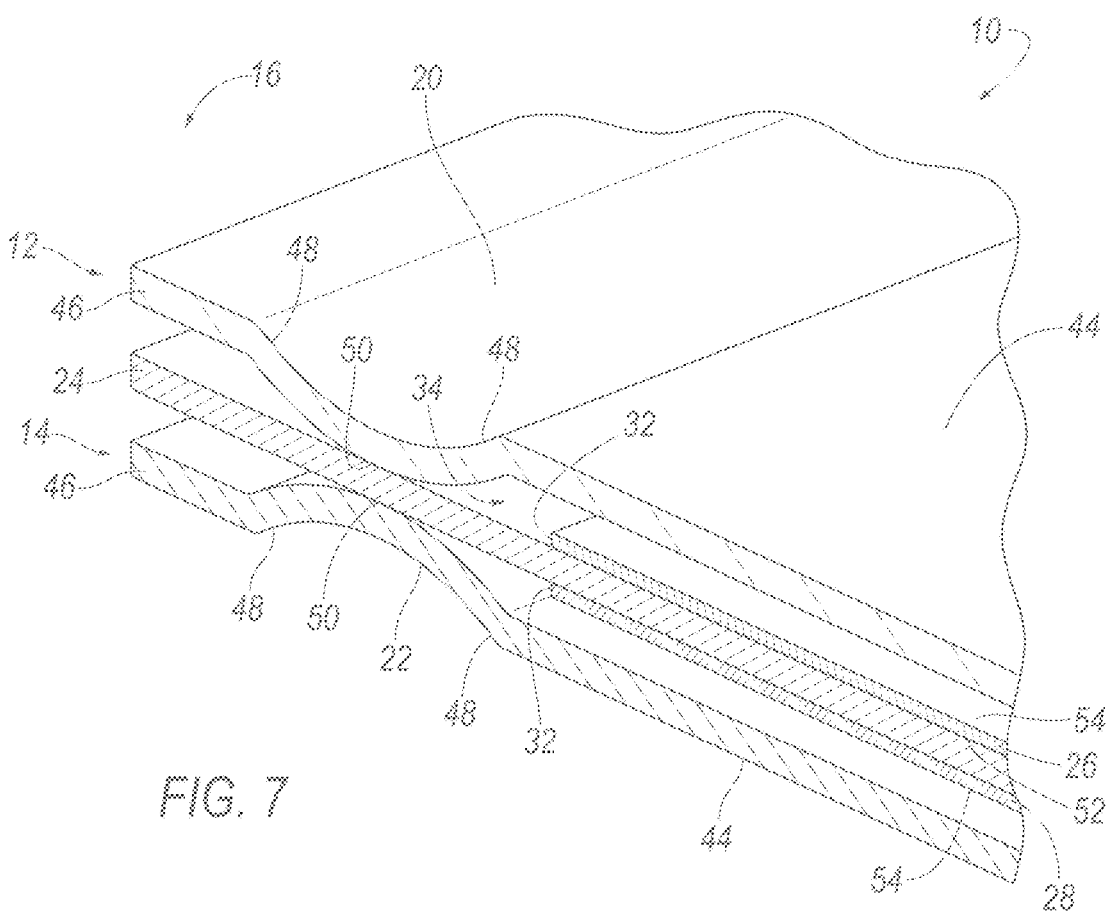
FIG. 7 is a cross-section of a second embodiment of gasket.
Figure 8:
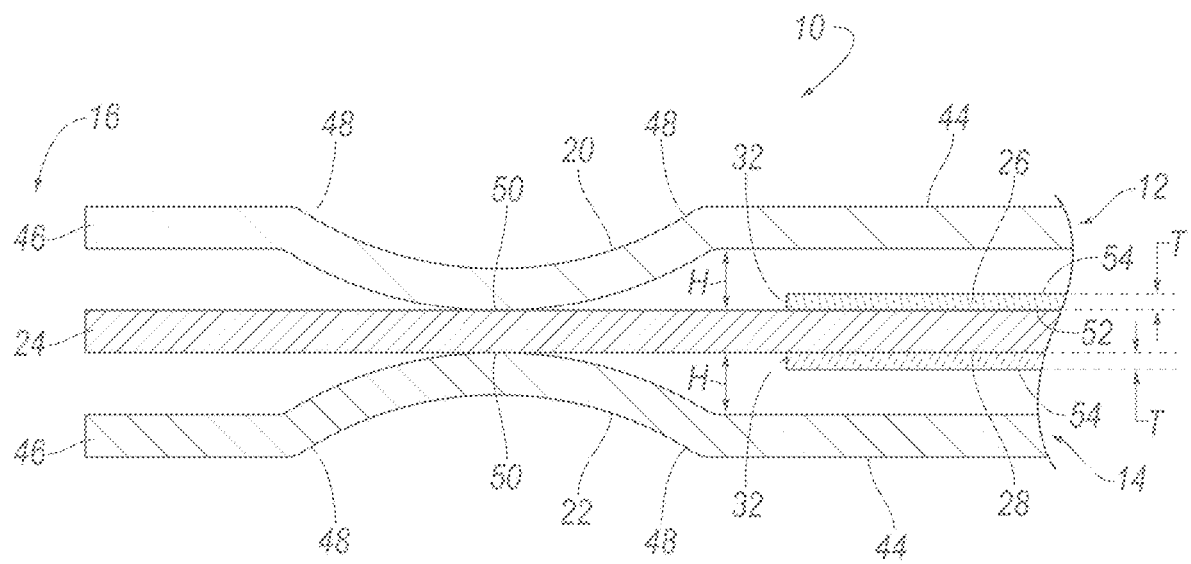
FIG. 8 is another cross-section of the second embodiment of the gasket.

The figures include two example embodiments of the gasket 10. A first embodiment of the gasket 10 is shown in FIGS. 3-6. In the first embodiment, the gasket 10 includes one spacer layer (referred to as "first spacer layer 26") between the first intermediate layer 24 and the first functional layer 12. A second embodiment of the gasket 10 is shown in FIGS. 7-9. In the second embodiment, the gasket 10 also includes a second spacer layer 28 between the intermediate layer 24 and the second functional layer 14. Common numerals are used to identify common features in the first and second embodiments.

Figure 5:
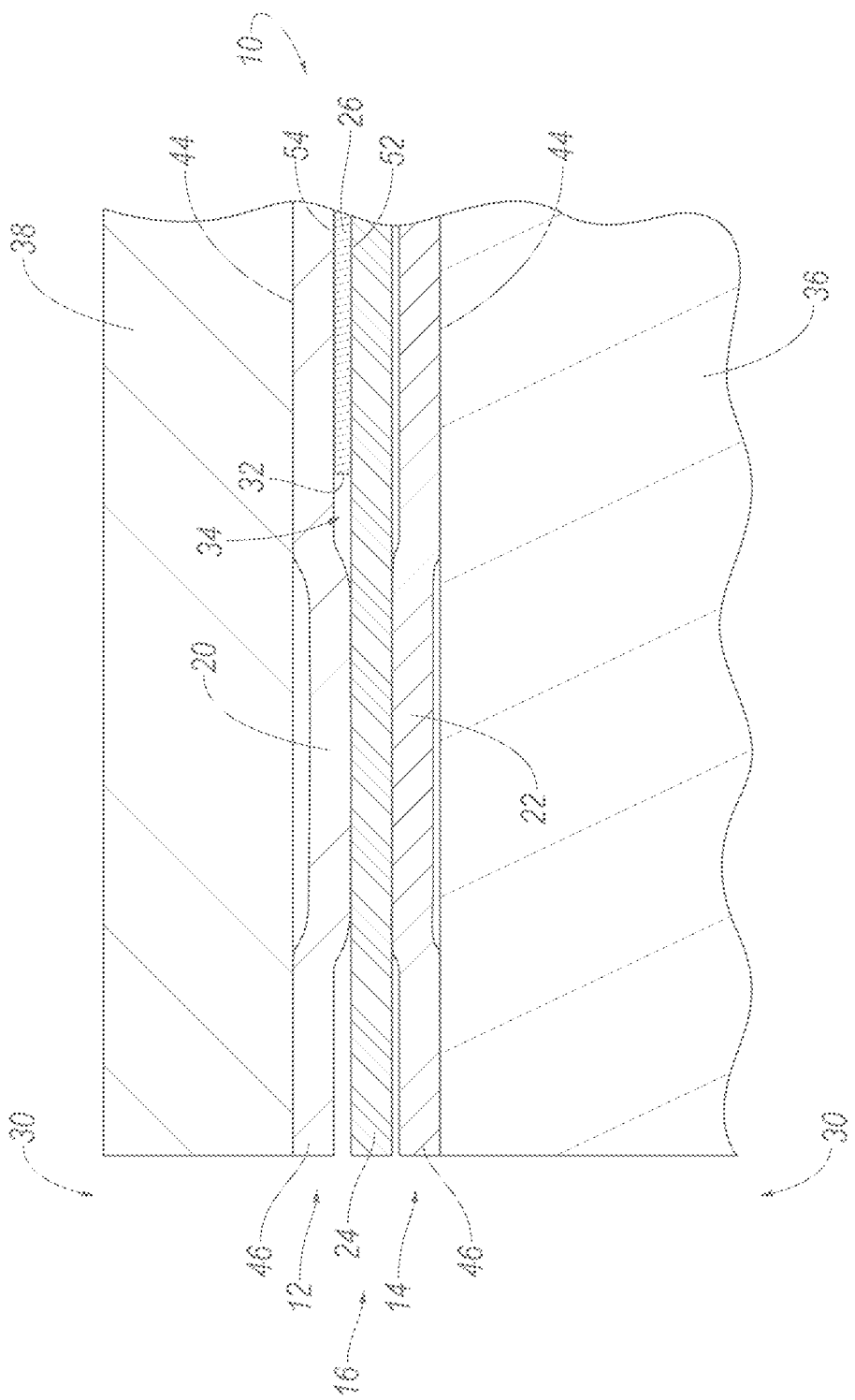
FIG. 5 is a cross-section of the gasket, a cylinder head, and an exhaust manifold after assembly.
Figure 6:
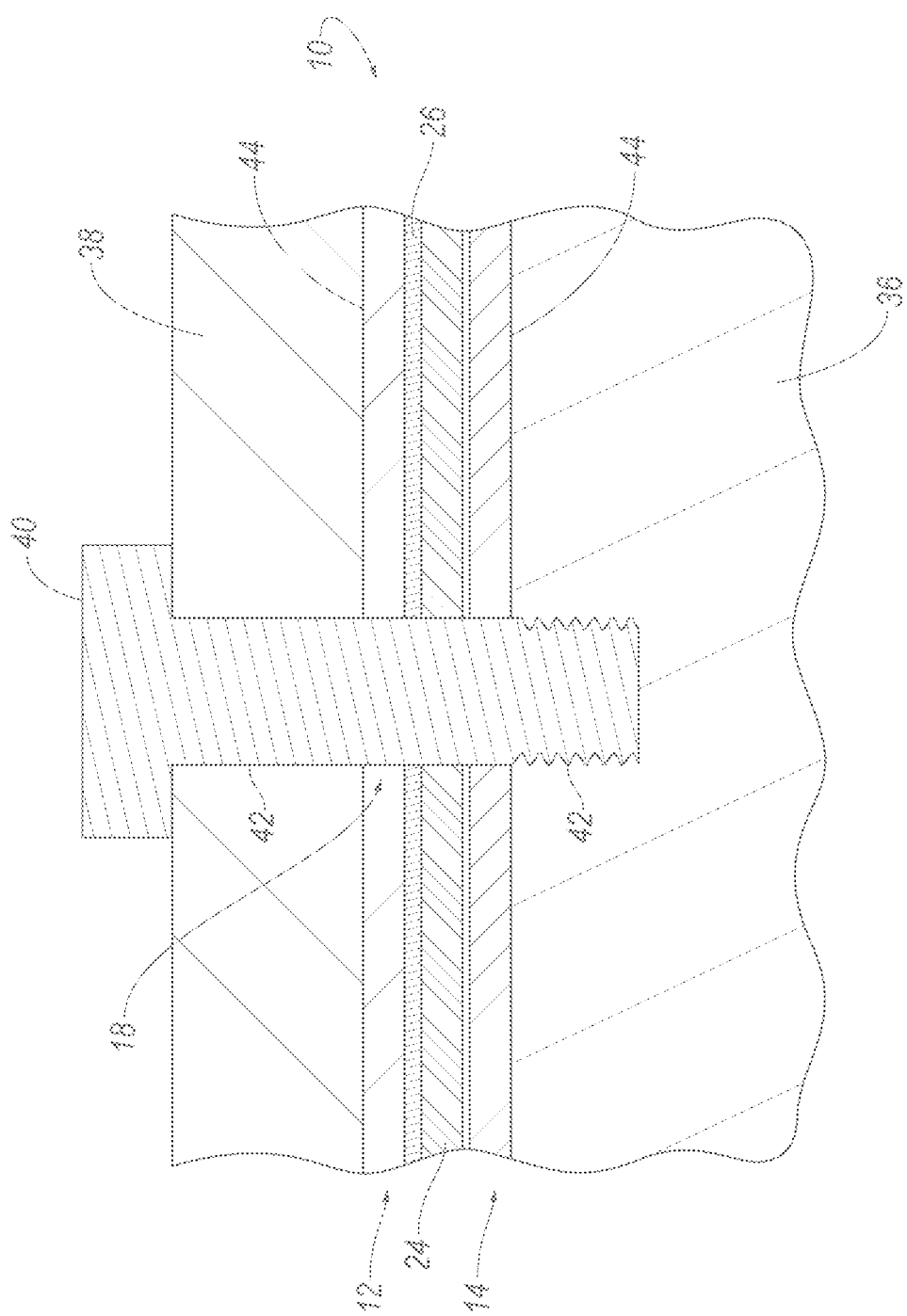
FIG. 6 is a cross-section of the gasket, the cylinder head, and an exhaust manifold at a fastener hole after assembly of the gasket to the engine.

The internal combustion engine, shown in part in FIGS. 5, 6, and 9, includes the cylinder head 36 and the exhaust manifold 38. The internal combustion engine may be for a vehicle, e.g., a passenger automobile, construction vehicle, agricultural vehicle, etc. An exhaust gas port 30 extends through the cylinder head 36 and the exhaust manifold 38 to transmit exhaust gas from the cylinder head 36 to the exhaust manifold 38. The cylinder head 36 and the exhaust manifold 38 may define any suitable number of exhaust gas ports 30. In the example shown in the figures, the gasket 10 is designed for an cylinder head 36 that includes at least four exhaust gas ports 30. Specifically, the gasket 10 shown in the figures includes four bores 16 and the bores 16 are positioned to be aligned with four exhaust gas ports 30. When the bores 16 are aligned with the exhaust gas ports 30, exhaust flows from the exhaust gas port 30 of the cylinder head 36, through the bore 16 of the gasket 10, and into the exhaust gas port 30 of the exhaust manifold 38. In examples including more than one bore 16, the gasket 10 may include a hole 34 in the spacer layer 26, 28 at each bore 16. In such examples, the spacer layer 26, 28 extends continuously between the holes 34.

The cylinder head 36 and the exhaust manifold 38 include fastening holes 42 (one of which is shown in FIG. 6) aligned with each other. The fastening holes 42 receive fasteners 40, e.g., threaded fasteners 40. The fasteners 40 tighten the exhaust manifold 38 to the cylinder head 36 and fix the exhaust manifold 38 to the cylinder head 36. Fastener holes 18 of the gasket 10 are aligned with the fastening holes 42 in the cylinder head 36 and the exhaust manifold 38. As shown in FIG. 6, the fastener 40 extends through the fastener hole 18 and the fastening holes 42. The gasket 10 may be designed to include any suitable number of fastener holes 18 to correspond to any suitable number of fastening holes 42 in the cylinder head 36 and exhaust manifold 38. In the example shown in the figures, the gasket 10 includes four fastener holes 18 for an cylinder head 36 and exhaust manifold 38 that each include four corresponding fastening holes 42.

With reference to FIGS. 1-4, the gasket 10 includes the first functional layer 12, the second functional layer 14, the intermediate layer 24, and at least one spacer layer 26, 28. The first functional layer 12, the second functional layer 14, the intermediate layer 24, and/or the spacer layer 26, 28 may be metal, e.g., steel. The gasket 10 may be generally planar. Specifically, the first functional layer 12 and the second functional layer 14 may each include an outward surface 44 and the outward surfaces 44 may be planar. The gasket 10 may have a uniform thickness. Specifically, the thickness of the gasket 10 between the outward surfaces 44 may be uniform across the gasket 10. The outward surfaces 44 abut the cylinder head 36 and the exhaust manifold 38. In the example shown in the figures, the first functional layer 12 abuts the exhaust manifold 38 and the second functional layer 14 abuts the cylinder head 36 by way of example. As another example, the first functional layer 12 may abut the cylinder head 36 and the second functional layer 14 may abut the exhaust manifold 38.

Figure 3:
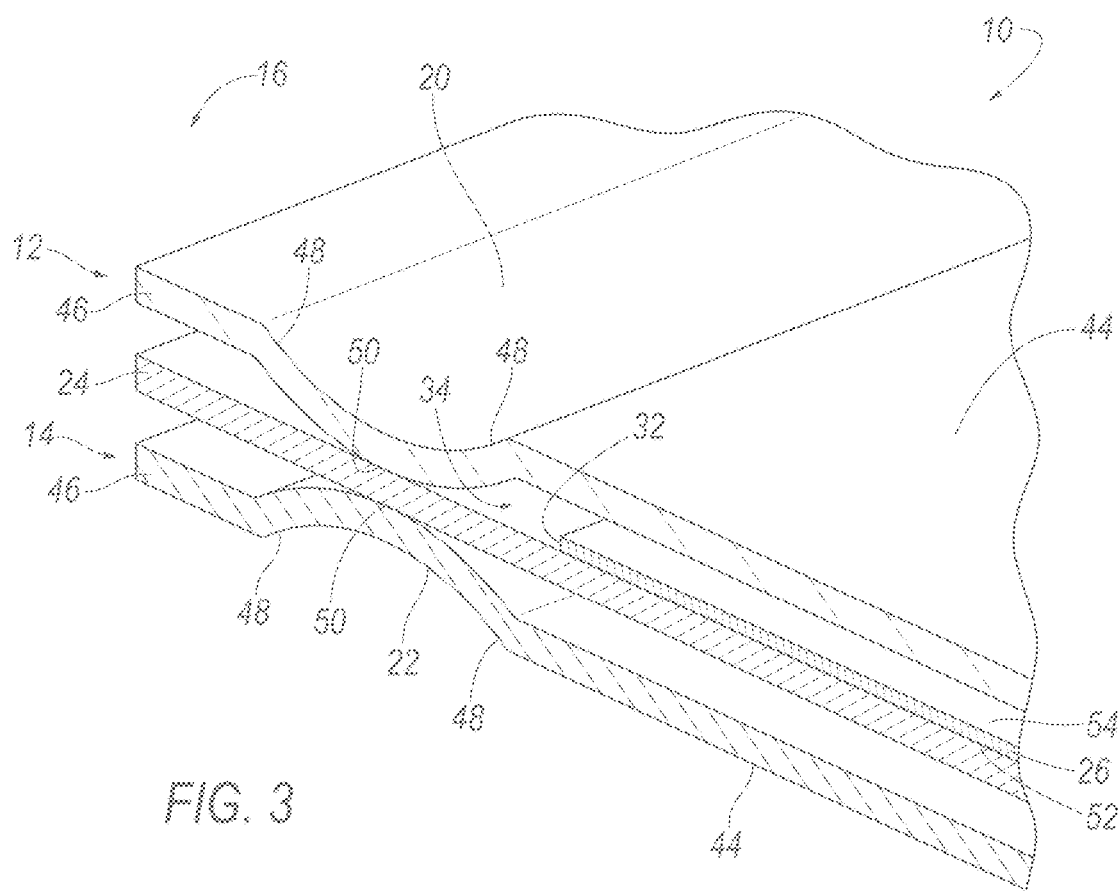
FIG. 3 is a cross-section of the gasket before assembly to an engine.
Figure 4:
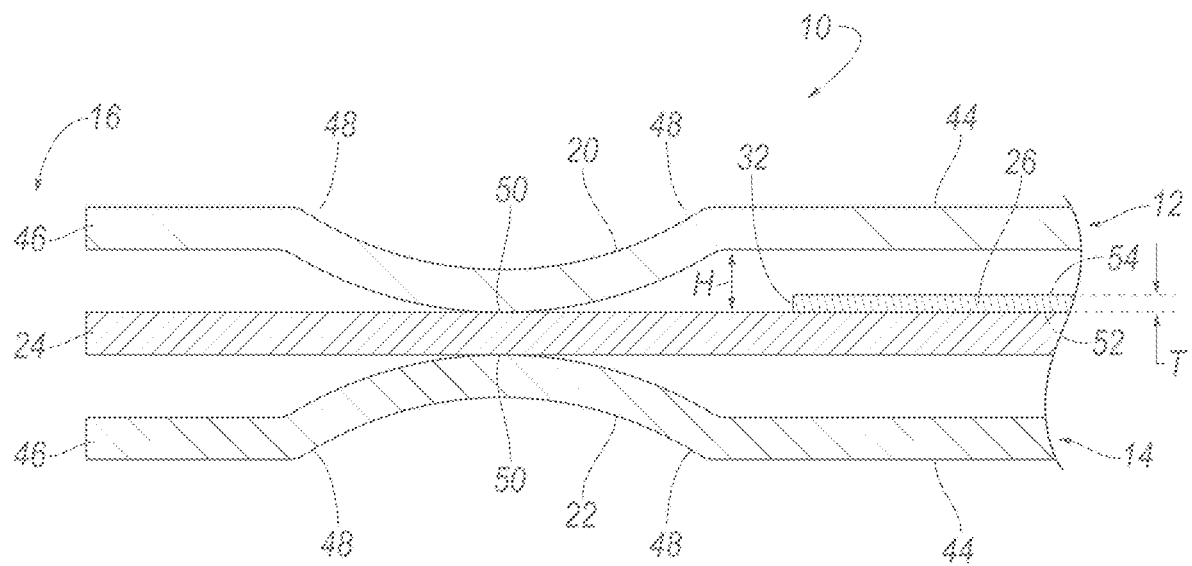
FIG. 4 is another cross-section of the gasket before assembly to an engine.

With reference to FIGS. 3 and 4, the first functional layer 12 and the second functional layer 14 define the bore 16. Specifically, the first functional layer 12 and the second functional layer 14 include lips 46, respectively, and the lips 46 define the bore 16. The bore 16 is a void, e.g., a cylindrical void in the examples shown in the figures, that extends through the gasket 10 from the outward surface 44 of the first functional layer 12 to the second functional layer 14.

The first embossment 20 protrudes toward the first functional layer 12 and the second embossment 22 protrudes toward the first functional layer 12. The first embossment 20 and the second embossment 22 are arcuate in cross-section. Specifically, the first embossment 20 and the second embossment 22 are convex facing each other and are concave at the respective outward surfaces 44. The first embossment 20 is unitary with the rest of the first functional layer 12 and the second embossment 22 is unitary with the rest of the second functional layer 14. Unitary means a single, uniform piece of material with no seams, joints, fasteners 40, or adhesives holding it together, i.e., formed together simultaneously as a single continuous unit, e.g., by stamping, molding, forging, casting, machining from a unitary blank, etc. In the example shown in the figures, the first embossment 20 and the second embossment 22 are formed by stamping. Non-unitary components, in contrast, are formed separately and subsequently assembled, e.g., by welding, etc. The first functional layer 12 and the second functional layer 14 may be planar except at the first embossment 20 and the second embossment 22, respectively, and may have a uniform thickness, i.e., a uniform material thickness.

As set forth above, the first embossment 20 and the second embossment 22 are resilient. In other words, when compressed and not over-compressed and/or over-flattened, the first embossment 20 and the second embossment 22 return toward their pre-compressed shape when compression is released. As set forth above, the spacer layer 26, 28 prevents over-compression and over-flattening of the first embossment 20 and/or the second embossment 22. The first embossment 20 and the second embossment 22 are designed to be resilient, i.e., are sized and shaped to be resilient when not over-compressed and/or over-flattened.

Figure 2:
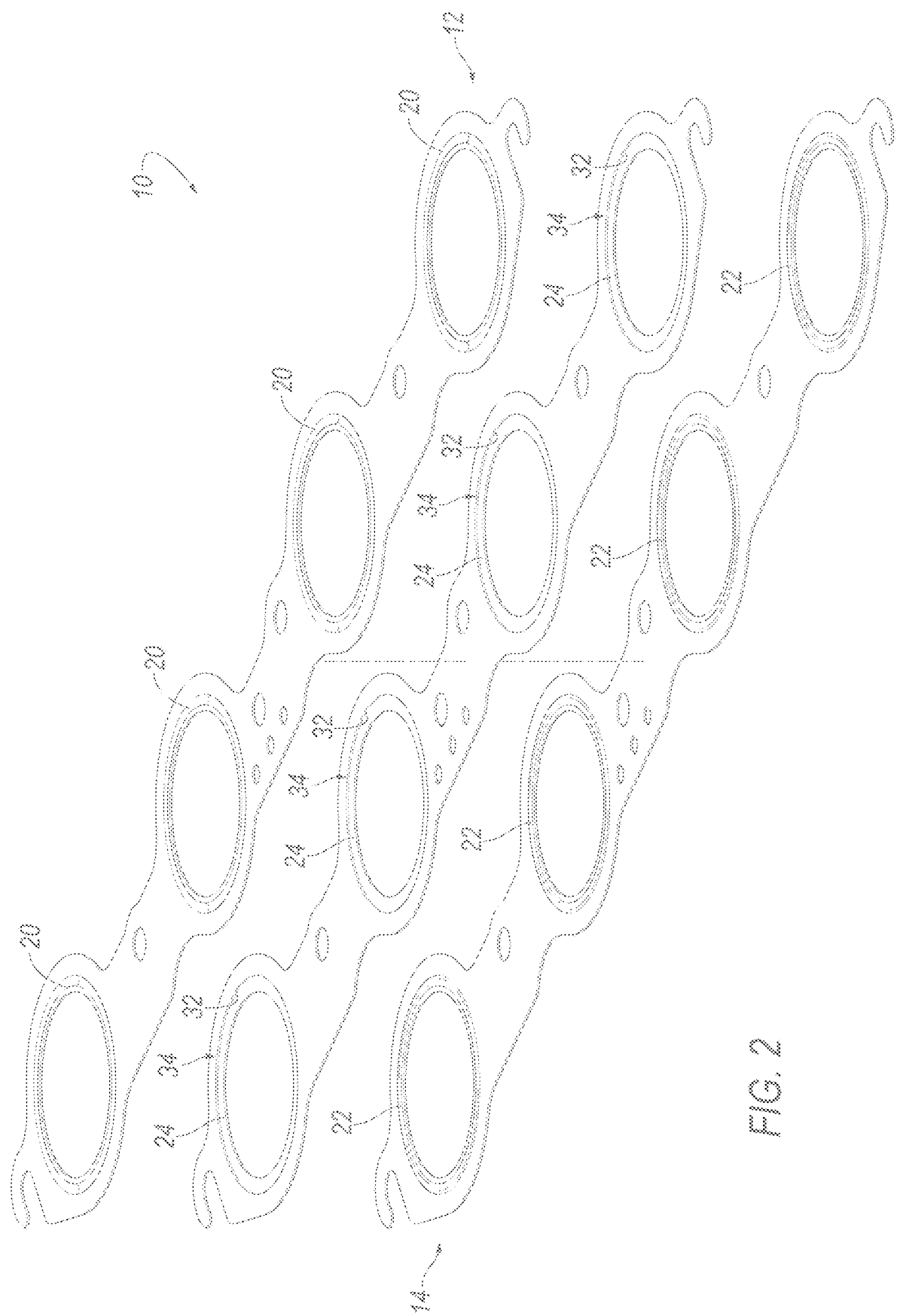
FIG. 2 is perspective view of the gasket with a first functional layer and a second functional layer exploded from an intermediate layer and a spacer layer.

With reference to FIGS. 1 and 2, the first embossment 20 and the second embossment 22 encircle the bore 16. In other words, the first embossment 20 and the second embossment 22 extend endlessly around the bore 16. Specifically, the first embossment 20 and the second embossment 22 may be circular, as shown in the figures, or may be any other suitable shape that encircles the bore 16. The first embossment 20 and the second embossment 22 may be spaced from the bore 16. In the examples shown in the figures, the first functional layer 12 and the second functional layer 14 include lips 46, respectively, that extend from the first embossment 20 and the second embossment 22 to the bore 16.

With reference to FIGS. 3 and 4, the intermediate layer 24 is between the first functional layer 12 and the second functional layer 14. At least a portion of the intermediate layer 24 is spaced from the first functional layer 12 and at least a portion of intermediate layer 24 may be spaced from the second functional layer 14 (e.g., in the example shown in FIGS. 7-9). Specifically, the first spacer layer 26 spaces the intermediate layer 24 from the first functional layer 12 and the second spacer layer 28 may space the intermediate layer 24 from the second functional layer 14.

The intermediate layer 24 abuts the first embossment 20 and the second embossment 22. Specifically, the first embossment 20 and the second embossment 22 each include two bases 48 and a peak 50 between the two bases 48. The peaks 50 abut the intermediate layer 24. Specifically, the peaks 50 abut opposite sides of the intermediate layer 24. The intermediate layer 24 extends from the first embossment 20 and the second embossment 22 toward the bore 16. For example, the intermediate layer 24 may extend from the first embossment 20 and the second embossment 22 to the bore 16. Specifically, the intermediate layer 24 includes a hole 34 at the bore 16 and the hole 34 may have the same diameter and the bore 16 defined by the lips 46.

The intermediate layer 24 extends from the first embossment 20 and the second embossment 22 to the fastener hole 18. Specifically, the fastener hole 18 extends through the intermediate layer 24. In examples including more than one fastener hole 18, each of the fastener holes 18 extend through the intermediate layer 24. The fastener hole 18 may have the same diameter at the intermediate layer 24, the first functional layer 12, and the second functional layer 14.

The intermediate layer 24 has a generally uniform thickness, i.e., a uniform material thickness. The intermediate layer 24 may be flat, i.e., without changes in material thickness or features that deviate from flat.

With reference to FIGS. 3 and 4, the first functional layer 12 may abut the first spacer layer 26, the first spacer layer 26 may abut the intermediate layer 24, and the intermediate layer 24 may abut the second functional layer 14. With reference to FIGS. 7 and 8, in examples including the second spacer layer 28, the second spacer layer 28 may abut the intermediate layer 24 and the second functional layer 14. One or more of the first functional layer 12, the second functional layer 14, the intermediate layer 24, the first spacer layer 26, and the second spacer layer 28 may be connected to each other, e.g., by welding, such as laser welding. The first functional layer 12, the second functional layer 14, the intermediate layer 24, the first spacer layer 26, and the second spacer layer 28 may be formed separately and subsequently connected to each other. As another example, the intermediate layer 24 may be unitary with the first spacer layer 26 and/or the second spacer layer 28, e.g., the difference in thickness of the portion of the intermediate layer 24 extending from the spacer layer 26, 28 toward the bore 16 being formed by machining, stamping, etc.

The first spacer layer 26 and the second spacer layer 28 may be identical, as shown in the example in FIGS. 7-9. Specifically, the first spacer layer 26 and the second spacer layer 28 may be mirror images of each other, as shown in FIGS. 7-9.

The spacer layer 26, 28 has an inner edge 32 defining a hole 34 through the spacer layer 26, 28. In the example shown in FIGS. 3-5, the inner edge 32 of the first spacer layer 26 encircles the first embossment 20. Specifically, the inner edge 32 and the first embossment 20 may be in a common plane. The inner edge 32 extends endlessly around the first embossment 20. The inner edge 32 may be circular, as shown in the figures, or may be any other suitable shape that encircles the first embossment 20. In the example shown in the figures in which the inner edge 32 and the first embossment 20 are circular, the inner edge 32 and the first embodiment may be concentric. The inner edge 32 may be concentric with the bore 16, as shown in the figures. Likewise, in the example shown in FIGS. 7-9, the inner edge 32 of the second spacer layer 28 encircles the second embossment 22.

The spacer layer 26, 28 includes an inboard surface 52 and an outboard surface 54. The inboard surface 52 of the first spacer layer 26 may abut the intermediate layer 24 and the outboard surface 54 of the first spacer layer 26 may abut the first functional layer 12. In examples including the second spacer layer 28, the inboard surface 52 of the second spacer layer 28 may abut the intermediate layer 24 and the outboard surface 54 of the second spacer layer 28 may abut the second functional layer 14. The spacer layer 26, 28 has a generally uniform thickness, i.e., uniform material thickness. The spacer layer 26, 28 may be flat, i.e., without changes in material thickness or features that deviate from flat.

The outboard surface 54 of the first spacer layer 26 is in a plane that extends through the first embossment 20 between the peak 50 and both bases 48 of the first embossment 20. The inboard surface 52 of the first spacer layer 26 and the peak 50 are in a common plane, i.e., the plane defined by one of the surfaces of the intermediate layer 24. The thickness T of the first spacer layer 26 is less than the height H of the first embossment 20 from the bases 48 to the peak 50. This ensures that the first spacer layer 26 prevents over-compression and over-flattening of the first embossment 20. Specifically, the first spacer layer 26 has a thickness T designed to retain resiliency in the first embossment 20 when the exhaust manifold 38 is tightened to the cylinder head 36. Likewise, the outboard surface 54 of the second spacer layer 28 is designed to retain the resiliency of the second embossment 22 when the exhaust manifold 38 is tightened to the cylinder head 36.

The spacer layer 26, 28 extends from the inner edge 32 to the fastener hole 18. Specifically, the spacer layer 26, 28 is continuous from the inner edge 32 to the fastener hole 18. In examples including more than one bore 16 and more than one fastener hole 18, the spacer layer 26, 28 extends one continuously from the bores 16 to the fastener holes 18. The fastener hole 18 may extend through the spacer layer 26, 28. As an example, the only voids in the spacer layer 26, 28 are the voids and the fastener holes 18. The spacer layer 26, 28 may match the outer perimeter 56 of the first functional layer 12 and the second functional layer 14. Since the spacer layer 26, 28 extends from the inner edge 32 to the fastener hole 18, the spacer layer 26, 28 supports the first functional layer 12, the second functional layer 14, and the intermediate layer 24 at the fastener hole 18 to prevent flange bending in any of the first functional layer 12, the second functional layer 14, and the intermediate layer 24 when the exhaust manifold 38 is fastened to the cylinder head 36. In examples including more than one bore 16 and more than one fastener hole 18, the extension of the spacer layer 26, 28 from each of the bores 16 to each of the fastener holes 18 prevents multiple points of flange bend.

The disclosure has been described in an illustrative manner, and it is to be understood that the terminology which has been used is intended to be in the nature of words of description rather than of limitation. The adjectives "first," "second," etc., are used merely as identifiers do not signify order or importance. Many modifications and variations of the present disclosure are possible in light of the above teachings, and the disclosure may be practiced otherwise than as specifically described.

The invention claimed is:

1. A multi-layer metal gasket comprising:
a first functional layer and a second functional layer;
a bore extending through the first functional layer and the second functional layer, the bore having an axis;
a fastener hole extending through the first functional layer and the second functional layer;
the first functional layer having a first embossment protruding toward the second functional layer and the second functional layer having a second embossment protruding toward the first functional layer, the first embossment and the second embossment each encircling the bore;
an intermediate layer between the first functional layer and the second functional layer, the intermediate layer abutting the first functional layer and the second functional layer, the intermediate layer extending between the first and second embossment and extending from the first and second embossments to the fastener hole;
the first functional layer including a lip extending from the first embossment to the bore and the second functional layer including a lip extending from the second embossment to the bore;
the lip of the first functional layer and the lip of the second functional layer being spaced from each other along the axis of the bore;
the lip of the first functional layer and the lip of the second functional layer at the bore being spaced from the intermediate layer along the axis of the bore; and
a spacer layer between the intermediate layer and the first functional layer, the spacer layer having an inner edge defining a hole through the spacer layer, the inner edge encircling the first embossment, the spacer layer extending from the inner edge to the fastener hole.

2. The multi-layer metal gasket as set forth in claim 1, wherein the fastener hole extends through the spacer layer.

3. The multi-layer metal gasket as set forth in claim 2, wherein the fastener hole extends through the intermediate layer.

4. The multi-layer gasket as set forth in claim 1, wherein the fastener hole extends through the intermediate layer.

5. The multi-layer metal gasket as set forth in claim 1, wherein the intermediate layer and the spacer layer are discrete and connected to each other.

6. The multi-layer metal gasket as set forth in claim 1, wherein the intermediate layer extends from the first and second embossments toward the bore.

7. The multi-layer metal gasket as set forth in claim 1, wherein the hole of the spacer layer is concentric with the bore.

8. The multi-layer metal gasket as set forth in claim 1, wherein the first functional layer, the second functional layer, the intermediate layer, and the spacer layer are metal.

9. The multi-layer metal gasket as set forth in claim 1, wherein the first functional layer abuts the spacer layer, the spacer layer abuts the intermediate layer, and the intermediate layer abuts the second functional layer.

10. The multi-layer gasket as set forth in claim 1, wherein the spacer layer has a generally uniform thickness.

11. The multi-layer gasket as set forth in claim 10, wherein the intermediate layer has a generally uniform thickness.

12. A multi-layer metal gasket comprising:
a first functional layer and a second functional layer;
a bore extending through the first functional layer and the second functional layer, the bore having an axis;
the first functional layer having a first embossment protruding toward the second functional layer and the second functional layer having a second embossment protruding toward the first functional layer, the first embossment and the second embossment each encircling the bore;
an intermediate layer having a uniform thickness and being between the first functional layer and the second functional layer, the intermediate layer abutting the first functional layer and the second functional layer;
the first functional layer including a lip extending from the first embossment to the bore and the second functional layer including a lip extending from the second embossment to the bore;
the lip of the first functional layer and the lip of the second functional layer being spaced from each other along the axis of the bore;
the lip of the first functional layer and the lip of the second functional layer at the bore being spaced from the intermediate layer along the axis of the bore;
a spacer layer having a uniform thickness and being between the intermediate layer and the first functional layer; and
a fastener hole extending through the first functional layer, the spacer layer, the intermediate layer, and the second functional layer;
the intermediate layer extending between the first and second embossment and extending from the first and second embossments to the fastener hole; and
the spacer layer having an inner edge defining a hole through the spacer layer, the inner edge encircling the first embossment and the hole being concentric with the bore, the spacer layer extending from the inner edge to the fastener hole; and the first functional layer abutting the spacer layer, the spacer layer abutting the intermediate layer, and the intermediate layer abutting the second functional layer.

13. The multi-layer metal gasket as set forth in claim 12, wherein the intermediate layer and the spacer layer are discrete and connected to each other.

14. The multi-layer metal gasket as set forth in claim 12, wherein the intermediate layer extends from the first and second embossments toward the bore.

15. The multi-layer metal gasket as set forth in claim 12, wherein the hole of the spacer layer is concentric with the bore.

16. The multi-layer metal gasket as set forth in claim 12, wherein the first functional layer, the second functional layer, the intermediate layer, and the spacer layer are metal.

17. An internal combustion engine comprising:
a cylinder head;
an exhaust manifold with an exhaust gas port extending through the cylinder head and the exhaust manifold; and
a multi-layer metal gasket between the cylinder head and the exhaust manifold;
the multi-layer metal gasket having a first functional layer, a second functional layer, an intermediate layer between the first functional layer and the second functional layer, and a spacer layer between the intermediate layer and the first functional layer;
the multi-layer metal gasket having a bore extending through the first functional layer and the second functional layer, the bore having an axis and the bore being aligned with the exhaust gas port;
the multi-layer metal gasket having a fastener hole extending through the first functional layer and the second functional layer;
the first functional layer having a first embossment protruding toward the second functional layer and the second functional layer having a second embossment protruding toward the first functional layer, the first embossment and the second embossment each encircling the bore;
the first functional layer including a lip extending from the first embossment to the bore and the second functional layer including a lip extending from the second embossment to the bore;
the lip of the first functional layer and the lip of the second functional layer being spaced from each other along the axis of the bore;
the lip of the first functional layer and the lip of the second functional layer at the bore being spaced from the intermediate layer along the axis of the bore;
the intermediate layer abutting the first functional layer and the second functional layer;
the intermediate layer extending between the first and second embossment and extending from the first and second embossments to the fastener hole; and
the spacer layer having an inner edge defining a hole through the spacer layer, the inner edge encircling the first embossment, the spacer layer extending from the inner edge to the fastener hole.

18. The multi-layer metal gasket as set forth in claim 1, wherein the first embossment is unitary with the lip of the first functional layer and the second embossment is unitary with the lip of the second functional layer.

19. The multi-layer metal gasket as set forth in claim 1, wherein the first embossment and the second embossment are arcuate in cross-section.

20. The multi-layer metal gasket as set forth in claim 1, further comprising a second spacer layer between the intermediate layer and the second functional layer, the second spacer layer having an inner edge defining a hole through the second spacer layer, the inner edge of the second spacer layer encircling the second embossment, the second spacer layer extending from the inner edge of the second spacer layer to the fastener hole.

\* \* \* \* \*